United States Patent Office
3,806,470
Patented Apr. 23, 1974

3,806,470
CATALYST COMPOSITIONS OF SCHEELITE CRYSTAL STRUCTURE CONTAINING BISMUTH IONS AND CATION VACANCIES
Kamran Aykan, Woodbury, N.J., and Donald B. Rogers, and Arthur W. Sleight, Wilmington, Del., assignors to E. I. du Pont de Nemours and Company, Wilmington, Del.
No Drawing. Continuation-in-part of abandoned application Ser. No. 75,237, Sept. 24, 1970. This application Oct. 4, 1971, Ser. No. 186,408
Int. Cl. B01j 11/08
U.S. Cl. 252—462    12 Claims

ABSTRACT OF THE DISCLOSURE

Catalysts for the oxidation, ammoxidation and oxidative dehydrogenation of olefins comprise compositions having a scheelite type crystal structure, bismuth, and cation vacancies. Illustrative is $Na_{.44}Bi_{.52}\square_{.04}MoO_4$.

RELATED APPLICATION

This application is a continuation-in-part of our application Ser. No. 75,237, filed Sept. 24, 1970, now abandoned.

BACKGROUND OF THE INVENTION

Field of the invention

The invention relates to catalytic oxidation and ammoxidation of olefins, as for example, the conversion of propylene to acrolein or to acrylonitrile. The catalysts have a scheelite crystal structure and contain bismuth ions and cation vaccines.

Prior art

Catalysts for the oxidation and ammoxidation of olefins are known in the art and include materials based on bismuth molybdate where the bismuth is present above a definite minimum ratio with respect to the molybdenum. The art generally teaches the amount of bismuth should not be less than 1/3 the amount of molybdenum and preferably the ratio should be 3:4, or more, in order to avoid sublimation of the molybdenum and consequent decomposition of the catalyst. Such catalysts have disadvantages in being relatively brittle and thermally unstable. Austrian Pats. 247,304 and 248,410 seek to overcome these disadvantages by combining bismuth and molybdenum oxides with divalent metals such as calcium and lead. Koch Pat. U.S.. 3,387,038 teaches that molybdenum oxide is effective as a catalyst when combined solely with alkaline earth oxides although the catalytic effect is further promoted by minor amounts of many elements including bismuth. Even the preferred embodiments of Koch's catalysts, however, give relatively low conversions of propylene to acrolein and require the periodic addition of molybdic acid in order to prevent the loss of that activity.

Silicon and phosphorus are widely recognized as useful promoters for bismuth-molybdenum oxide compositions used as catalysts. This is believed to be related to the well known tendency of these two elements to combine in mixed oxides (heteropoly acids) with molybdenum and tungsten. Silica can be intimately incorporated by combining the catalyst precursors in the presence of a colloidal silicic acid. Even though such silica may be termed a "support," its special interaction is recognized by Callahan et al., U.S. 3,362,998 and McClellan, U.S. 3,415,886, and auxiliary supports are generally used to support these silica-bearing catalysts during reaction.

DESCRIPTION OF THE INVENTION

It has now been found that compositions having a phase, generally indicated by the formula $ABO_4$, of scheelite-type crystal structure in which some of the A cation sites are vacant, that is, not occupied by any ion, and some of which are occupied by bismuth ions, are effective catalysts for the ammoxidation of olefins to unsaturated nitriles, the oxidation of olefins to unsaturated aldehyde, and the oxidative dehydrogenation of olefins to diolefins. The number of the A sites that are either cation vacancies (represented hereinafter by the symbol $\square$) or occupied by bismuth ions may be very small but these two types of site occupation must coexist for the composition to have high catalytic activity.

It has been further found that the remaining A cation sites, and the B cation sites, may be occupied by a variety of positive ions of appropriate size, that is, having ionic radii which will not substantially change the scheelite crystal structure. A large number of ions may be selected provided the electrical charge of the composition is zero.

The ions occupying the type A sites of the scheelite-type crystal structure generally are coordinated by eight surrounding oxygen atoms and have ionic radii appropriate to this coordination in the range of about 0.9 to about 1.6 A. According to the invention the type A cations may be selected from the group consisting of bismuth, silver, sodium, lithium, potassium, zirconium, hafnium, yttrium, lanthanides (elements having an atomic number in the range 57–71), uranium, thallium and thorium. In addition to bismuth, which must be present, preferred type A cations are sodium, lithium, silver and yttrium. As previously indicated, it is also essential that some type A cation sites remain unoccupied.

The ions occupying the type B sites of the scheelite-type crystal structure are generally tetrahedrally coordinated by oxygen and have ionic radii appropriate to this coordination ranging from about 0.3 to about 0.5 A. According to the invention, the type B cations are selected from the group consisting of molybdenum, tungsten, iron, germanium, zinc, arsenic, rhenium, gallium, aluminum, niobium and chromium. Molybdenum, tungsten and iron are preferred type B ions. Especially preferred are compositions in which the B ions consist of molybdenum and iron.

It is preferred for maximum effectiveness that the scheelite-type catalyst consist essentially of a single phase.

A further preferred embodiment of the invention, because of their excellent catalytic activity are the compositions $ABO_4$ in which up to about 15% of the A cation sites are vacent.

The invention may thus be described as a catalyst which has scheelite-type crystal structure of the general formula

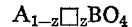

$$A_{1-z}\square_zBO_4$$

wherein A represents cations having ionic radii in the range of about 0.9 to about 1.6 A., some of which are trivalent bismuth, and others are optionally selected from the group consisting of silver, sodium, lithium, potassium, zirconium, hafnium, yttrium, lanthanides, uranium, thallium and thorium; B represents one or more cations having ionic radii in the range of about 0.3 to about 0.5 A. selected from the group consisting of molybdenum, iron, germanium, zinc, arsenic, rhenium, gallium, aluminum, niobium and chromium; and $z$ is a positive number up to about 0.15 expressed as $0 < z \leq 0.15$.

"Scheelite-type crystal structure" means a phase of generic type $ABO_4$ with an atomic arrangement analogous to that found in the mineral scheelite ($CaWO_4$). A discussion of scheelite crystals may be found in R. W. G. Wyckoff, "Crystal Structures," vol. 3, 2nd ed. 1965, pp. 19–22, published by Interscience Publishers. Scheelite crystal structures generally have tetragonal symmetry and can be characterized by the two lattice constants $a_0$ and $c_0$ as obtained by X-ray diffraction data. The range of $a_0$ is about 4.8 to 6.0 A. and the ratio of $c_0/a_0$ is about 2. The atomic arrangement in the scheelite structure, also given by Wyckoff, gives rise to a characteristic X-ray diffraction pattern by which materials having scheelite crystal structure can be identified.

It is to be understood that "scheelite-type crystal structure" is intended here and in the claims to also cover variant crystal structures which have minor distortions in angle or edge size from the usual or classical tetragonal symmetry given above. For example, when the distortion resides in a third lattice constant, $b_0$, an orthorhombic distortion results while a distortion in either angle $\beta$ or $\gamma$ results in a monoclinic distortion. Where $\beta_0$ is within 10% of the value of $a_0$, each being in the range of about 4.8 to 6.0 A., and where the angle $\beta$ or $\gamma$ is within 5° of the normal 90° angle, such crystal structures are contemplated to be within the scope of scheelite-type crystal structures of this invention. It should also be noted that $a_0$ and $c_0$ or $b_0$ and $c_0$ may be interchanged to conform to certain crystallographic conventions and in the case of monoclinic symmetry the unit cell may be redefined so that $\beta$ or $\gamma$ departs greatly from 90°. In all the variations which may occur, however, the essential atomic arrangement is present which determines and characterizes scheelite-type crystal structure. That atomic arrangement is identified by the characteristic X-ray diffraction pattern it produces even though some of the diffraction peaks will be split in the case of the variant crystals.

It will also be recognized that where a single type of cation site is occupied by more than one cation then under some conditions nonrandom site occupation will produce superstructure lines in the characteristic scheelite X-ray pattern. Under such circumstances the exact characterization by unit cell parameters will require multiplication of one or more of the unit cell dimensions by a small whole number in order to characterize the special proportionate distribution of cations. Thus, for example, a defect-free scheelite-type structure might be produced from the stoichiometry $BiFe_{1/3}Mo_{2/3}O_4$ in which ⅓ of the type B sites are occupied by $Fe^{+3}$ ions. The arrangement of $Fe^{+3}$ and $Mo^{+6}$ ions, however, is apparently an ordered one since weak superstructure lines appear in the X-ray pattern, and these require a larger unit cell for indexing. The resultant monoclinic cell $a=16.16$ A. (equivalent to $3 \times 5.39$ A.), $b=5.25$ A., $c=11.65$ A. and $\gamma=90.97°$, larger by extension along the $a$ axis, is readily seen to be a mere ordering modification of the monoclinic scheelite variant within the limits previously given for scheelites. On the other hand, the well-known bismuth molybdate $Bi_2O_3 \cdot 3MoO_3$ does not have a scheelite-type structure within the meaning given here as can be seen by its distinctly different X-ray pattern.

The charge on the various A and B metal ions can be varied consistent with the requirement that the sum of the positive charges of all A and B metal ions is exactly balanced by the sum of the charges on the negative ions. The generic formula $ABO_4$ for scheelite thus includes ternary oxides ranging from $$A^{+1}B^{+7}O_4 \text{ to } A^{+4}B^{+4}O_4$$

as well as polynary oxides where either A or B or both may comprise a mixture of ions of appropriate size whose average charge is covered by the range above.

The presence of bismuth ions on the type A cation sites can be determined by customary analytical procedures for the determination of bismuth since its ions are too large for the type B sites. In eight-fold coordination $Bi^{3+}$ has an ionic radius of 1.11 A. and is well suited for type A sites.

The presence of unoccupied type A cation sites can be determined by a deficiency of type A cations with respect to type B metal ions. Since in the scheelite-type structure there is one A and one B site per formula $ABO_4$ and since the B cation sites are always fully occupied by the type B atoms, the number of type A cation vacancies, $z$, can be determined by subtracting the number of type A atoms from the number of type B atoms. Thus in the single-phase scheelite-type composition whose formula has been determined by elemental analysis as

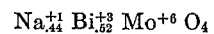

the sum of the type A gram atoms is 0.96. Since there is one B type atom (molybdenum) present in the above formula, it follows that the sum of the two type A atoms (sodium and bismuth) plus any type A site vacancies, must equal 1. As noted, however, the type A atoms which are present total only .96 which indicates there are .04 type A sites that are vacant. The formula for the above single phase scheelite-type composition is therefore more properly written as

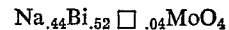

This composition is electrically neutral since the 8 negative charges from oxygen are just balanced by 6 positive charges from molybdenum, $1.56(3 \times .52)$ from Bi, and .44 from Na for a total of 8 positive charges.

The $BO_4$ tetrahedra are characteristic of the scheelite-type structure even though a certain amount of type A cations which link adjacent tetrahedra may be missing from the lattice. Thus, oxides of the scheelite phase will have, within normal analytical accuracy, four oxygen anions per B cation. In preparing scheelite catalysts of the invention the component oxides or their oxide precursors should be chosen so that in their normal oxidation states after calcining, as hereinafter described, four gram atoms of oxygen will be present for each gram atom of B cation. The presence of substantially more or less oxygen relative to the B cation will lead to dilution of the $ABO_4$ catalyst of the invention with another phase. The proper proportions of the various oxides or oxide precursors that should be combined to form a pure scheelite-type phase of desired vacancy content can be readily determined from the requirements of electroneutrality and site occupation described above. In the simple cases where a single ion occupies the B sites and the necessary cation vacancies result from simple permutation of the A cation charge, the following generic formulae pertain for ternary oxides, where $z$ equals the number of vacancies:

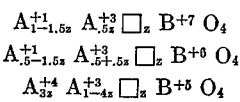

The necessary type A cation vacancies can also be provided by permutations of variously charged ions on the type B cation sites as in the system

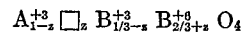

For example, to prepare a pure scheelite-type catalyst in the ternary system $Bi_2O_3$-$Fe_2O_3$-$MoO_3$ having a cation vacancy content of 4%, the last formula above would be used with $z=0.04$ to give the preferred molar proportions of starting materials, viz., 0.480 $Bi_2O_3$; 0.146 $Fe_2O_3$; 0.707 $MoO_3$. It will be understood that further permutations of both type A and type B cations in the same composition can be devised to provide a very wide range of new catalytic materials with specified content of $Bi^{+3}$ and vacancies on the type A cation sites.

It should be kept in mind that when the number of defects or cation vacancies becomes too high, their random occurrence may be replaced by an ordered arrangement with the production of a crystal structure that departs from the limits hereinbefore described for the scheelite-type structure. It is to be expected that the change from the scheelite-type structure to other phases with ordered vacancies will depend in a complex way on the temperature and on the particular ions in the lattice. It has been found that in many systems corresponding to the formula

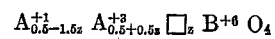

the maximum value of $z$ consistent with a pure tetragonal scheelite-type phase is about 0.15, relatively independent of the ions $A^{+1}$, $A^{+3}$, and $B^{+6}$. The catalytic activity is not destroyed if another phase is present along with the scheelite phase in which both cation vacancies and $Bi^{+3}$ ions coexist. However, it is desirable for maximum effectiveness to prepare the catalyst compounds as substantially pure phases. These are characterized by X-ray diffraction powder diagrams which can be indexed in their entirety according to the scheelite structure. Large amounts of excess or unreacted components will act as diluents and can interfere with the intended catalytic function, particularly if they accumulate at the surface.

The catalysts of the invention may thus be characterized in that:

(1) There are four oxygen atoms for each B atom.

(2) The type A and type B ions are selected from those cations appropriate to the scheelite-type structure as indicated herein.

(3) They are electrically neutral, the number of positive charges exactly equaling the number of negative charges.

(4) The type A sites, equal in number to the type B sites, include sites which are unoccupied and sites which are occupied by trivalent bismuth.

(5) Their X-ray diffraction pattern is characteristic of scheelite-type crystal structure.

The catalysts of the invention can be prepared by various methods. The usual method is to calcine mixtures of oxides, or any salt which yields the corresponding oxide by thermal decomposition, e.g., carbonates, nitrates, oxalates, hydroxides, etc., in the proper ratios for the desired composition. The catalysts can also be prepared by mixing solutions containing proper amounts of the type A and type B metal salts, evaporating, drying, and finally calcining. The starting solutions are usually nitrates in the case of $A^{+1}$, $A^{+3}$, $A^{+4}$, and Bi, but other soluble salts can be used. The solvent can be water or an organic liquid depending on the solubility of the salt. The amount of solvent is not critical and it is preferred to use only that amount needed to effect complete solution of the salt.

Calcining temperatures vary from about 400 to about 1100° C. The optimum temperature depends upon the particular catalyst being prepared. Higher temperatures are preferred in order to facilitate reaction and to assure a homogeneous poduct. A critical upper limit for calcining temperatures is imposed by the formation of a liquid phase. The products of the invention have incongruent melting points, i.e., the liquid and solid in equilibrium in the melting range have quite different compositions. A liquid phase formed during calcining tends to produce both compositional and physical segregation which are difficult to homogenize at lower temperature. Higher temperatures are favored in general for catalysts containing tungsten while lower temperatures are used for catalysts rich in bismuth and molybdenum.

The time of calcination is not critical; times of 1 to 100 hours may be used, but 16–48 hours is preferred. Longer times are required at lower temperatures. Calcining times may be shortened and homogeneity of the products improved by regrinding between periods of heating. A generally advantageous procedure is to grind the dry components intimately, calcine for 2–16 hours at 600–800° C., then regrind and calcine again for 16–32 hours at 600–800° C.

The container used for calcining may be made of various inert materials such as gold or other precious metals, alumina or other ceramics. The calcination is usually carried out in a muffle furnace in which the sample is exposed to an atmosphere of air. Reducing atmospheres should be avoided to prevent the reduction of oxides of easily reduced metals such as silver and bismuth.

The completeness of the reaction may be followed by X-ray diffraction of the products at any stage. When formation of a cation-deficient scheelite-type phase is complete, all lines of the X-ray powder pattern can be indexed on the basis of a scheelite-type unit cell with line intensities in qualitative agreement with those expected for the scheelite-type structure. The dimensions of the unit cells of these scheelite phases vary significantly with changes in either type or number of cations in the A sites, and can be used to characterize the composition of the phase obtained. For example, in the tetragonal scheelite-type system

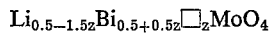
$$Li_{0.5-1.5z}Bi_{0.5+0.5z}\square_z MoO_4$$

equilibrated at 600° C., the cell length, $c_0$, increases regularly from 11.469 A. at $z=0$ to 11.627 A. at $z=0.15$; further attempts to increase $z$ do not affect the cell dimensions but begin to introduce extraneous X-ray lines. While somewhat different limits may be found at other temperatures and with other ions, the presence of a cation deficient, Bi-containing scheelite-type structure is shown by the significant difference in the cell dimensions from those of the defect-free phases.

The products of the invention are excellent heterogeneous catalysts for organic oxidation reactions. They are particularly useful for the oxidation of propylene to acrolein, the production of acrylonitrile from propylene, $NH_3$, and $O_2$, and the conversion of butene to butadiene. The catalysts show excellent conversions of propylene, good selectivity, and retain their high initial activity without need for frequent and costly regeneration steps. The presence of water in the feed gas is not necessary as it is with many prior art catalysts, but it may be used if desired. Air or oxygen may be used, or the feed gas may be further diluted with nitrogen, for example. The catalyst may be used in fixed-bed or fluidized-bed reactors; they may be used with most of the usual catalyst support materials or they may be used without support, and any type of reactor suitable for vapor phase reactions may be employed.

The temperature of the reaction zone may vary from 350° C. to 550° C., although it is preferred to operate within the temperature range of 400° C. to 500° C. The actual surface temperature of the catalyst particles may be considerably higher because of the exothermic nature of the reaction. Pressure is not a critical factor in the practice of this invention. The process may be conveniently operated at atmospheric pressure. In most instances, the reaction is conducted at pressures ranging from 0.5 to 10 atmospheres, but higher or lower pressures may be used if desired.

The oxygen used in this process may be obtained from any source, although it is generally most economical and convenient to use air. Alternatively, pure oxygen or mixtures of oxygen and air may be employed in the oxidation process, including oxidative dehydrogenation process, and a mixture of air and ammonia for the ammoxidation process.

Neither the presence of cation vacancies alone nor the presence of bismuth ions alone is sufficient to produce good catalytic activity in the scheelite-type compositions of the invention. However, when both coexist, even in small amounts, excellent catalytic activity is obtained.

The use of very high surface area or reactive materials as catalyst supports is to be avoided. In particular, intimate mixtures of the cation deficient scheelite-type compositions of the invention with reactive materials such as silica should not be excessively heated.

It will be obvious to one skilled in the use of catalysts for carrying out oxidation reactions that the composition of the catalytic sites on the catalyst surface during the course of the reaction may depart somewhat from initial stoichiometry. Particularly in oxidation reactions elements of variable valency may coexist in more than one oxidation state as an essential feature of the catalytic mechanism. Thus in the present invention it is contemplated for example that Mo or W may be present to a small extent as pentavalent species along with the preponderant hexavalent species. Similarly, bismuth could exist to some small extent in an oxidation state greater than in the normal trivalent cation. Such variations can be equivalently represented as slight departures from the oxygen stoichiometry hereinbefore described. Thus in the idealized $ABO_4$ formula there might be slightly more or less than 4.00 g. atoms of oxygen, or a small fraction of the $O^{-2}$ ions might be replaced by $OH^-$ ions without departing from the spirit of the invention.

By the term "olefin" as used herein is meant the open-chain as well as cyclic olefins. Among the many olefinic compounds which may be utilized in accordance with the process of the invention, the following compounds are illustrative; propylene, butene-1, butene-2, isobutylene, pentene-1, pentene-2, 3-methylbutene-1, 2-methyl-butene-2, hexene-1, hexene-2, 4-methyl pentene-1, 3,3-dimethyl-butene-1, 4-methyl-pentene-2, octene-1, cyclopentene, cyclohexene, 3-methyl-cyclohexene, etc. This invention is directed particularly to the oxidation of the lower alkenes (3 to 8 carbon atoms) but higher alkenes may also be utilized with efficacy. These compounds and their various homologs and analogs may be substituted in the nucleus and/or in the substituents in various degrees by straight-chain alicyclic or hetero-cyclic radicals. The process of the invention is applicable to individual olefins as well as to mixtures of olefins.

The process of this invention is particularly adapted to the conversion of propylene to acrolein, isobutylene to methacrolein, butene-1 or butene-2 to methyl vinyl ketone, pentene-1 or pentene-2 to ethyl vinyl ketone and/or pentene-3-one-2, 2-methyl-butene-2 to methyl isopropenyl ketone, cyclopentene to cyclopentenone-2, and the like.

SPECIFIC EMBODIMENTS OF THE INVENTION

The following are illustrative examples in which all parts or percentages are by weight unless otherwise stated.

EXAMPLE 1

2.332 g. of $Na_2CO_3$, 12.116 g. of $Bi_2O_3$, and 14.395 g. of $MoO_3$ are mixed by grinding in a mortar, calcined in air for 16 hours at 625° C., reground, and calcined an additional 16 hours at 625° C. The product is a single-phase tetragonal scheelite-type structure with the lattice parameters, $a_0=5.276$ A. and $c_0=11.595$ A. A theoretical density on the basis of X-ray data for the composition $Na_{0.44}Bi_{0.52}\square_{0.04}MoO_4$ is 5.74 g./cm.$^3$ in comparison to its observed density of 5.75 g./cm.$^3$ by the pycnometer method.

Using the procedures given in this specification the following products of the invention are obtained.

TABLE I $Li_{.275}Bi_{.575}\square_{.15}MoO_4$
$Li_{.44}La_{.50}Bi_{.02}\square_{.04}WO_4$
$Tl_{.94}Bi_{.02}\square_{.04}ReO_4$
$Th_{.15}Bi_{.80}\square_{.05}AsO$
$Th_{.80}Bi_{.10}\square_{.10}Ge_{.5}As_{.5}O_4$
$Bi_{.99}\square_{.01}Ga_{.323}Mo_{.677}O_4$
$Bi_{.98}\square_{.02}Ge_{.47}Mo_{.53}O_4$
$Bi_{.96}\square_{.04}Zn_{.22}Mo_{.78}O_4$
$Ag_{.20}Zr_{.40}Bi_{.39}\square_{.01}Fe_{.323}Mo_{.677}O_4$

EXAMPLE 2

27.595 g. of single-phase tetragonal $Na_{0.50}Bi_{0.50}MoO_4$ is mixed with 14.964 g. of single-phase, monocline $Bi_2O_3 \cdot 3MoO_3$ by ball-milling and is then calcined in air for 16 hours at 640° C. It is reground and calcined an additional 16 hours at 640° C. By X-ray diffraction analysis the product is a pure tetragonal scheelite-type phase. The composition based on starting material is $Na_{0.33}Bi_{0.56}\square_{0.11}MoO_4$

EXAMPLE 3

A solution of 27.20 g. of $NaNO_3$ in 43 ml. $H_2O$ is mixed with a solution of 271.66 g. of $Bi(NO_3)_3 \cdot 5H_2O$ in a mixture of 19.4 ml. conc. $HNO_3$ and 194 ml. $H_2O$. A solution of 176.56 g. of $(NH_4)_6Mo_7O_{24} \cdot 4H_2O$ in 200 ml. $H_2O$ is added with vigorous agitation. The above mixture is homogenized by ball-milling, evaporated on a steam bath, dried for three hours at about 130° C., calcined in air for 16 hours at 600° C., reground, and calcined for an additional 16 hours at 625° C. The product is a single-phase tetragonal scheelite-type structure with a formula of $Na_{0.32}Bi_{0.56}\square_{0.12}MoO_4$ and with the lattice parameters, $a_0=5.276$ A. and $c_0=11.640$ A.

A portion of this product was mixed with an equal weight of SiC powder and formed into ⅛" pellets for testing catalytic activity in a ½" I.D. fixed bed reactor. Using a feed gas composed on a molar basis of 5.0% propylene, 47.9% air, and 47.1% nitrogen for a 2.0 second contact time at 485° C., 83.5% of the propylene was consumed and 61.0% of the initial propylene was converted to acrolein. When the feed gas consisted of 4.0% propylene, 4.9% ammonia, 48.7% air, and 42.4% nitrogen, then 88.4% of the propylene was consumed and 64.6% of the initial propylene was converted to acrylonitrile while only 1.8% was converted to acrolein.

A similar composition but free of cation vacancies, $Na_{0.50}Bi_{0.50}\square MoO_4$, was prepared and tested under similar conditions to those described above. Only 5.2% and 2.7% of the propylene feed was consumed under conditions for making acrolein and acrylonitrile, respectively.

Another portion of the composition $Na_{0.32}Bi_{0.56}\square_{0.12}MoO_4$ mixed with an equal weight of SiC powder was tested in the same reactor using as feed gas on a molar basis 5.0% 1-butene, 26.0% air, and 69.0% $N_2$. At atmospheric pressure and 450° C. using a contact time of 3 seconds, 97.0% of the 1-butene was consumed to form 1,3-butadiene in 67.4% conversion.

EXAMPLE 4

1.404 g. $Li_2CO_3$, 12.582 g. of $Bi_2O_3$, and 14.395 g. of $MoO_3$ are mixed by grinding in a mortar, calcined in air for 16 hours at 625° C., reground, and calcined for an additional 16 hours at 600° C. The product is a single-phase tetragonal scheelite-type structure with a formula $Li_{0.38}Bi_{0.54}\square_{0.08}MoO_4$ and with the lattice parameters, $a_0=5.232$ A. and $c_0=11.530$ A. A portion of the product was tested as a catalyst for the synthesis of acrolein under conditions comparable to those in Example 3. Conversion of propylene feed to acrolein was 65.1 mole percent. A similar composition $Li_{0.50}Bi_{0.50}MoO_4$ without cation vacancies converted only 23.7% of propylene to acrolein under the same conditions.

EXAMPLE 5

Solutions of 1.1495 g. of metallic Bi in $HNO_3$ and 0.5946 g. of $AgNO_3$ in $H_2O$ are mixed together and added with stirring to a solution of 1.7656 g. of $(NH_4)_6Mo_7O_{24} \cdot 4H_2O$ in $H_2O$. The product recovered by evaporation is ground and calcined in air overnight at 500° C., reground and again calcined overnight at 600° C. The final product is a single-phase tetragonal scheelite-type structure with a formula of $Ag_{0.35}Bi_{0.55}\square_{0.1}MoO_4$ and with $a_0=5.284$ A. and $c_0=11.678$ A.

When tested for the synthesis of acrolein using a 10/1 air/propylene ratio at least 53% conversion to acrolein was obtained whether the feed gas was diluted with nitrogen, diluted with a steam/nitrogen mixture, or used undiluted. With ammonia in the feed this product catalyzed acrylonitrile formation (55% conversion). A similar composition $Ag_{0.50}Bi_{0.50}MoO_4$ containing no cation vacancies gave less than 4% conversion to acrolein under similar conditions.

EXAMPLE 6

Bi(NO$_3$)$_3$·5H$_2$O (136.61 g.) and 37.42 g. of

Fe(NO$_3$)$_3$·9H$_2$O are dissolved in dilute nitric acid; 33.70 g. of (NH$_4$)$_6$Mo$_7$O$_{24}$·4H$_2$O are dissolved in water. The two solutions are mixed and the pH is adjusted to 6 using NH$_4$OH. The solution is then evaporated to dryness, ground and heated to 600° C. for about 10 hours. The product has the composition Bi$_{.993}$☐$_{.007}$Fe$_{.327}$Mo$_{.673}$O$_4$ has a monoclinic variation of the schellite crystal structure and is catalytically active for the synthesis of acrylonitrile from propylene, 71% conversion of feed propylene to acrylonitrile.

What is claimed is:

1. A catalyst which has scheelite-type crystal structure of the general formula $$A_{1-z}☐_z BO_4$$

wherein

A represents cations having ionic radii in the range of about 0.9 to about 1.6 A. some of which are trivalent bismuth and others are optionally selected from the group consisting of silver, sodium, lithium, potassium, yttrium and lanthanides;

B represents cations having ionic radii in the range of about 0.3 to about 0.5 A. comprising molybdenum;

☐ represents a cation vacancy in the crystal structure; and z is a positive number up to about 0.15 expressed as 0<z≦0.15.

2. A catalyst according to claim 1 on a support.

3. A catalyst according to claim 1 which includes iron.

4. A catalyst according to claim 1 wherein the A ions include sodium.

5. A catalyst according to claim 1 wherein the A ions include lithium.

6. A catalyst according to claim 1 wherein the A ions include silver.

7. A catalyst according to claim 1 wherein the A ions include yttrium.

8. The catalyst according to claim 1 which is

Na$_{.32}$Bi$_{.56}$☐$_{.12}$MoO$_4$

9. The catalyst according to claim 1 which is

Li$_{.38}$Bi$_{.54}$☐$_{.08}$MoO$_4$

10. The catalyst according to claim 1 which is

Ag$_{.35}$Bi$_{.55}$☐$_{.1}$MoO$_4$

11. The catalyst according to claim 1 which is

Bi$_{.993}$☐$_{.007}$Fe$_{.327}$Mo$_{.673}$O$_4$

12. A catalyst according to claim 1 having the formula $$A^{+1}_{5-1.5z} A^{+3}_{.5+.5z} ☐_z B^{+6} O_4$$

References Cited

UNITED STATES PATENTS

| | | | |
|---|---|---|---|
| 3,415,886 | 12/1968 | McClellan | 252—456 X |
| 3,316,182 | 4/1967 | McDaniel et al. | 252—467 X |
| 3,380,931 | 4/1968 | Ryland | 252—467 X |

FOREIGN PATENTS

| | | | |
|---|---|---|---|
| 967,877 | 8/1964 | Great Britain | 252—467 |
| 967,878 | 8/1964 | Great Britain | 252—467 |

DANIEL E. WYMAN, Primary Examiner

W. J. SHINE, Assistant Examiner

U.S. Cl. X.R.

252—467, 470, 463